(12) United States Patent
Hedström

(10) Patent No.: US 6,282,482 B1
(45) Date of Patent: Aug. 28, 2001

(54) DEVICE FOR CONTROLLING SPEED AND ACCELERATION OF A VEHICLE

(75) Inventor: Lars-Gunnar Hedström, Vagnhärad (SE)

(73) Assignee: Scania CV Aktiebolag (SE)

( * ) Notice: Subject to any disclaimer, the term of this patent is extended or adjusted under 35 U.S.C. 154(b) by 0 days.

(21) Appl. No.: 09/367,337

(22) PCT Filed: Jan. 30, 1998

(86) PCT No.: PCT/SE98/00134

§ 371 Date: Aug. 19, 1999

§ 102(e) Date: Aug. 19, 1999

(87) PCT Pub. No.: WO98/34809

PCT Pub. Date: Aug. 13, 1998

(30) Foreign Application Priority Data

Feb. 11, 1997 (CH) .................................................. 9700456

(51) Int. Cl.⁷ .................................................. B60K 31/00
(52) U.S. Cl. .................................................. 701/93; 701/70
(58) Field of Search .................................. 701/93, 70, 48; 180/170, 178, 179; 123/349, 350

(56) References Cited

U.S. PATENT DOCUMENTS

4,939,657    7/1990    Imai et al. ...................... 364/426.04
5,508,925 *  4/1996    Katayama et al. ...................... 701/93

FOREIGN PATENT DOCUMENTS

0441961    8/1991    (EP) .
456617    10/1988    (SE) .

* cited by examiner

*Primary Examiner*—Michael J. Zanelli
(74) *Attorney, Agent, or Firm*—Ostrolenk, Faber, Gerb & Soffen, LLP

(57) ABSTRACT

A device for controlling the drive of a vehicle, incorporating control means (1, 5, 6) which in a first operating state are arranged to control the vehicle so that the vehicle maintains a substantially constant speed and in a second operating state to control vehicle so that it accelerates. The device also incorporates an element (1, 2) which in the second operating state is arranged to make it possible to set any desired substantially constant acceleration of the vehicle.

10 Claims, 2 Drawing Sheets

DEVICE FOR CONTROLLING SPEED AND ACCELERATION OF A VEHICLE

The present invention relates to a device for controlling the drive of a vehicle, incorporating control means which in a first operating state are arranged to control the vehicle so that it maintains a substantially constant speed and in a second operating state to control the vehicle so that it accelerates.

STATE OF THE ART

It is usual today for various kinds of motor vehicles to be provided with such devices in order to be able to control their drive and adjust their speed automatically, i.e. by means of electronic control. These devices are often referred to conversationally as speed maintainers, cruise control, cruise settings, tempostats etc. It is also known that such devices may incorporate means of maintaining a constant vehicle speed, means of vehicle acceleration and means of vehicle retardation. The acceleration aspect of such known devices usually entails the vehicle accelerating with increasing acceleration or increasing torque, after a so-called time ramp. This usually involves the vehicle reaching maximum acceleration or torque after a relatively short period of time. Such an acceleration facility is sufficient in cases where only small changes of speed are desired, but not if it is desired to control the drive of the vehicle automatically over a substantial speed range and at the same time cater for changing conditions. Known devices thus provide no possibility of controlling acceleration to a suitable value, e.g. for a particular traffic situation.

EP-A-441 961 refers to such a device for adjusting the speed of a vehicle. This device includes a control which is designed to be situated on the steering column and which can be used to influence the speed of the vehicle. By rotating this control the driver can set a desired constant speed for the vehicle. The same control can also be shifted downwards from a position for constant speed to one of three defined positions in order to select a constant value for the acceleration it is desired to attain. The driver may thus select and achieve acceleration according to three different predetermined torque levels. This known device also makes it possible to change from such acceleration to maintaining constant speed and vice versa by pressing the control in towards the steering column. This known device thus incorporates a large number of different functions, which makes it difficult for users to handle.

BRIEF OF DESCRIPTION OF THE INVENTION

The object of the present invention is to provide a device by which it is possible to control the acceleration and/or retardation of a vehicle to a desired value in every situation. A further aspect of the invention is that the device should be easy to use.

This object is achieved with the device indicated in the introduction which is characterised in that it incorporates an element which in the second operating state is arranged to make it possible to set any desired substantially constant acceleration of the vehicle. Providing such a device with elements for setting any desired positive or negative acceleration enables the driver to control the vehicle's acceleration and/or retardation in a continuous manner during its forward movement and hence to adjust its speed increase or decrease dynamically according to his/her wishes and the prevailing circumstances such as traffic situation, fuel consumption, exhaust emissions, load carried, etc. At the same time, control means in a third operating state may be arranged to control the vehicle for retardation and the abovementioned setting element may be arranged to make it possible to set any desired constant retardation of the vehicle in the third operating state.

According to one embodiment of the present invention, said setting element is arranged to adopt a first position which corresponds to the first operating state. Thus, when the setting element is not being actively acted upon by the driver it can revert to the first position, which means that the vehicle will be driven at constant speed and in particular the speed which the vehicle has when said setting element reverts to the first position.

According to a further embodiment of the present invention, said setting element can be shifted from the first position in a first direction in order to reach the second operating state. In this embodiment the setting element may take the form, for example, of a lever which it is easy for the vehicle driver to use.

According to a further embodiment of the present invention, said setting element can be shifted from the first position to a second position arranged to generate an acceleration set-value which results in the vehicle accelerating at a constant acceleration, and to a third position arranged to generate an increasing acceleration set-value which enables the vehicle to accelerate with increasing acceleration, and said setting element, when in the second position, is arranged to generate an acceleration set-value which corresponds to the instantaneous acceleration set-value generated substantially immediately before said setting element is put into the second position. In such a version, the vehicle's driver can increase its speed with increasing acceleration by moving said setting element to the third position. When the driver has achieved the desired acceleration level, said setting element shifts to the second position and the acceleration remains constant, and when the desired speed is reached the setting element shifts back to the first position for constant vehicle speed. It is advantageous for said setting element to be arranged to generate a continuously increasing acceleration set-value in the third position. According to an advantageous version, said setting element can also be shifted from the first position to the second position against the action of a first spring force, and from the second position to the third position against the action of a second spring force, the second spring force being greater than the first. In this way, the vehicle driver can recognise the various positions, the increasing force required for operating said setting element during increasing acceleration will be perceived as natural in the context, and the functioning of said setting element will be understood intuitively by users.

According to a further embodiment of the present invention, said setting element can be shifted from the first position in a second direction in order to reach the third operating state. By thus shifting said setting element in another direction, e.g. the opposite direction, the vehicle driver can thus brake the vehicle with any desired retardation. Both braking and increase of speed may thus with advantage involve said setting element functioning in a similar manner.

According to a further embodiment of the present invention, said positions of said setting element are distinct, which makes it still easier for the vehicle driver to distinguish the various positions from one another.

According to a further embodiment of the present invention, said setting element can be shifted steplessly in the first direction from the first position, and the extent of its shift is matched by the generating of an increasing acceleration set-value. In such a version the vehicle driver can select any desired positive or negative acceleration at will by shifting said setting element to a position corresponding to the desired acceleration. For example, the acceleration may be substantially proportional to the position of said setting element. Likewise, said setting element may in particular be shiftable steplessly from the first position in the second direction and the extent of the shift may be matched by the generating of an increasing retardation set-value. It is also possible, with advantage, for said setting element to be shiftable from the first position against the action of an increasing spring force, thereby enabling intuitive understanding of the functioning of the device according to the invention.

According to a further embodiment of the present invention, the control means are connected to at least one vehicle component acting upon the drive and are arranged to control said vehicle component or components in response to the position of the control. Said vehicle component or components may comprise at least one of the following: a vehicle engine, a gearbox, a wheel brake arrangement, a braking arrangement which is arranged to act on the vehicle's driveline.

The present invention will now be explained in more detail by means of various embodiments described as examples and with reference to the attached drawings.

LIST OF DRAWINGS

DETAILED DESCRIPTION OF VARIOUS EMBODIMENTS.

Figure 1:
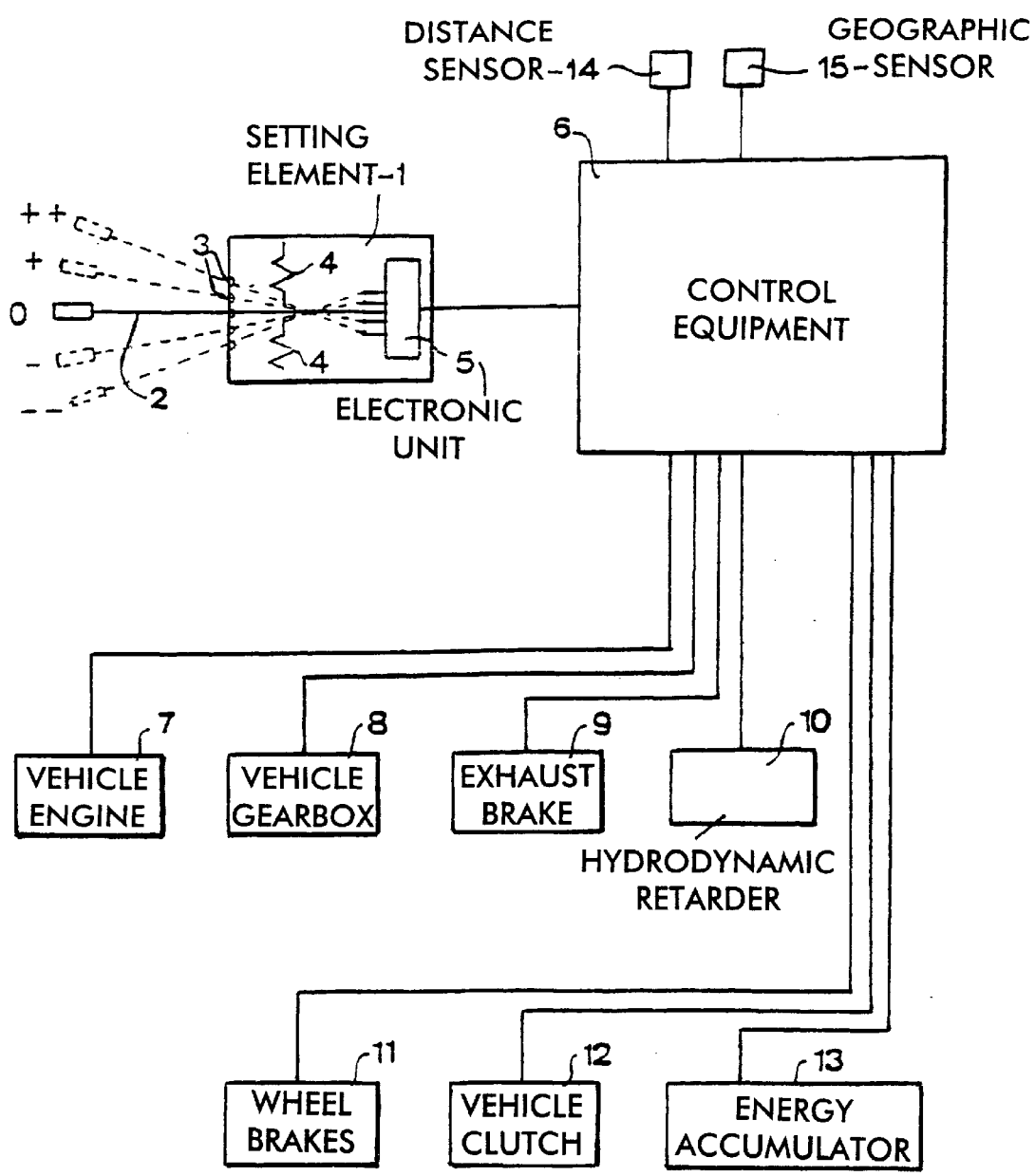
FIG. 1 shows a schematic view of a device according to a first embodiment of the invention.

FIG. 1 shows schematically an embodiment of a device for controlling the drive of a vehicle and examples of various vehicle components with which this control device cooperates.

The control device incorporates a setting element 1 which includes a control 2 which in FIG. 1 takes the form of a lever which can be shifted between five different positions designated "−−", "−", "0", "+", "++". The "−" position corresponds to increasing retardation of the vehicle, the "−−" position to constant retardation, the "0" position to constant speed, the "+" position to constant acceleration and the "++" position to increasing acceleration. The various positions are physically distinct, i.e. when the lever 2 is shifted towards a position it snaps into that position, e.g. by means of schematically depicted recesses 3 in a rail or the like against which the lever 2 abuts. The lever 2 tends to revert to the "0" position, i.e. it is urged back towards the "0" position by schematically depicted spring elements 4. The spring elements 4 are arranged so that the lever 2 can be shifted from the "0" position to the "−" position or the "+" position against the action of a relatively slight spring force, and from the "−" position and the "+" position to the "−−" position or the "++" position respectively against the action of a relatively greater spring force. The setting element 1 also includes an electronic unit 5 with five connection positions, each of which corresponds to one of the positions "−−", "−", "0", "+", "++". The electronic unit 5 is connected to the vehicle's control equipment, which is schematically represented by the box 6. The control equipment 6 may be structured in many different ways. For example, it may be centralised or decentralised, i.e. a number of different control units may be arranged in the vehicle and each be arranged to serve certain vehicle functions, as for example according to the so-called multiplex principle. Since various types of control equipment for vehicles are known per se, they will not be further described. The control equipment 6 cooperates with a number of different vehicle components such as the vehicle's engine 7. In the case of a combustion engine 7, the control equipment 6 is arranged to control the fuel supply so as to increase the torque from the engine and hence enable the vehicle to accelerate. The control of the fuel supply also makes it possible to brake or retard the vehicle by throttling the fuel supply, whereupon the engine's compression and internal friction will engender a braking torque. The control equipment 6 is also connected to the vehicle's gearbox 8, which incorporates a number of different gear positions. The control equipment 6 is arranged to select the appropriate gear position which corresponds to the desired acceleration, retardation or speed. The control equipment 6 is also connected to various braking arrangements which act upon the vehicle's driveline and are here exemplified by an exhaust brake 9 and a hydrodynamic brake 10, a so-called retarder. A simple version of the exhaust brake 9 may for example incorporate a damper or the like which is arranged in the exhaust system and can be used to throttle the exhaust flow, thereby engendering a braking torque and hence causing retardation of the vehicle. The hydrodynamic retarder 10 may be arranged before or after the gearbox and may for example incorporate an impeller which is coupled to the propeller shaft and is braked by means of hydraulic fluid. The control equipment 6 is also connected to the vehicle's wheel brakes 11 and arranged to control the braking torque to be applied. The control equipment 6 is also connected to the vehicle's clutch 12 in order, e.g. during high acceleration, to effect rapid disengagement to make it possible to change gear. The control equipment 6 may also be connected to some form of energy accumulator 13 which is arranged to absorb energy during retardation and deliver energy during acceleration. The control equipment 6 may also be connected to various types of detectors or sensors which detect various conditions of significance for optimum control of the drive. Such sensors may for example include a distance sensor 14 which indicates the vehicle's distance from another in front and a sensor 15 which indicates where the vehicle is geographically, a so-called GPS unit for receiving information via satellite.

When the lever 2 is in the "0" position, the electronic unit 5 generates a zero set-value for the vehicle's acceleration. In response to that zero set-value, the control equipment will act on the various vehicle components 7 to 13 so that they in an optimum manner, e.g. from the fuel consumption point of view, maintain the vehicle at a constant speed. If the lever 2 is moved to the "+" position, nothing happens, since this is the position for constant acceleration. Moving the lever 2 to on to the "++" position generates an increasing acceleration set-value and the control equipment will control the various vehicle components 7 to 13 so that the vehicle accelerates with increasing acceleration. This acceleration increase may be constant and continuous and may for example take place along a so-called time ramp. The increase may of course possibly not be linear. When the desired acceleration has been reached, the lever 2 is to some extent released so that it goes back to the "+" position, resulting in the generating of a constant acceleration set-value corresponding to the acceleration which the vehicle had at the time when the lever 2 left the "++" position. In a similar manner, a constant retardation set-value is generated when the lever 2 is moved to the "−" position and an increasing retardation set-value when the lever 2 is moved to the "−−" position.

It is advantageous for the speed maintenance system to be designed so that the speed maintenance function is only activated when the lever 2 is moved from "0" to one of the other positions. Before this activation takes place, the driver therefore takes care of speed maintenance in a conventional manner by means of the accelerator pedal. The speed maintenance function is deactivated in a conventional manner, e.g. upon activation of the brake pedal, the accelerator pedal, the retarder control or via a separate disconnecting control. There may be further disconnection functions such as automatic disconnection when some measured parameter presents a value at which constant speed maintenance is inappropriate.

The electronic unit 5 may take many different forms. It may in one version be very simple and in principle consist entirely of a changeover switch, in which case the above-mentioned set-values are generated in the vehicle's control equipment 6. The electronic unit 5 may also be of a more advanced kind and designed itself to generate said set-values.

Figure 2:
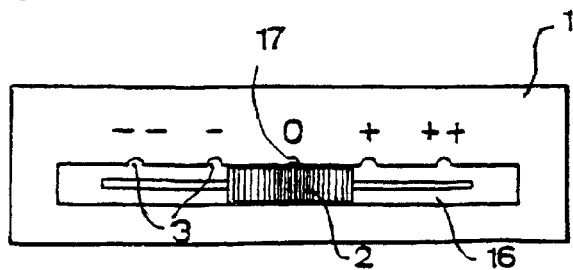
FIG. 2 shows an alternative version of a setting element of the device in FIG. 1.

FIG. 2 shows an alternative version of the setting element 1 with a control 2 which can be shifted sideways in two opposite directions from a central position corresponding to the "0" position. In the example depicted, the control 2 is arranged in a slot 16 or the like which along one side incorporates recesses 3 in which a raised portion 17 of the control is arranged to engage in order to denote the distinct positions. Also in this alternative version, it is advantageous for the control 2 to be urged back towards the central position by means of undepicted spring elements.

Figure 3:
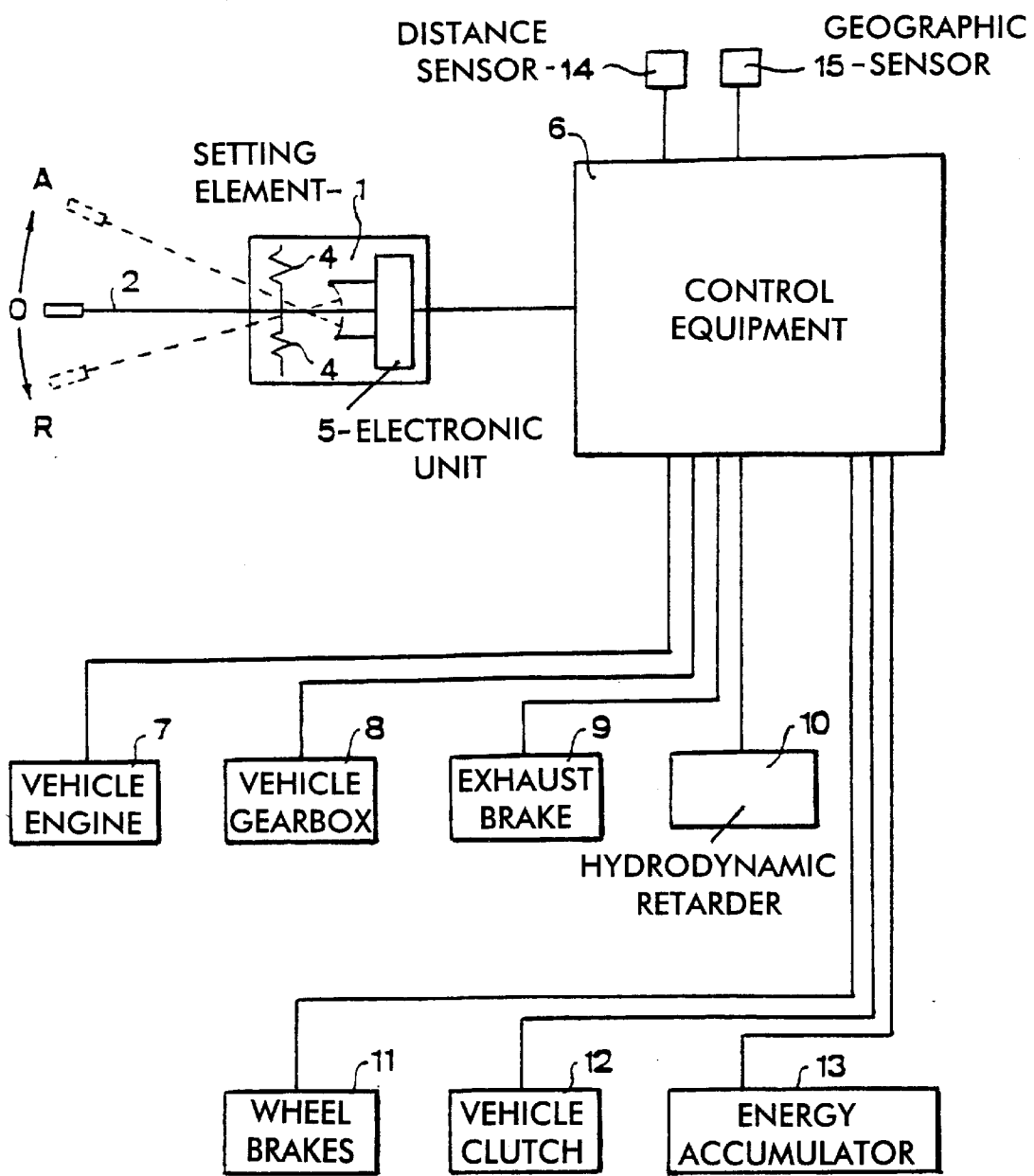
FIG. 3 shows a schematic view of a device according to a second embodiment of the invention.

FIG. 3 shows a second embodiment of the device. It should be noted that for elements with corresponding functions the same reference notations have been used in all the embodiments depicted. The device according to the second embodiment differs from that in the first in that the control 2, in the example shown the lever 2, cannot be shifted to distinct positions but can be shifted steplessly from the central position in a first direction A to accelerate the vehicle and in a second direction R to retard the vehicle. In this version the lever is again shifted from the central position against the action of an increasing spring force exerted by the depicted spring elements 4. In this case it is the extent of the shift or rotation that defines the acceleration set-value or retardation set-value to be generated. The set-value may for example be proportional to the extent of the shift or rotation. When the lever 2 is in the central position, a zero acceleration set-value is thus generated, i.e. the vehicle maintains constant speed. Moving the lever 2 upwards generates an acceleration set-value proportional to the extent of its upward movement, and shifting the lever 2 downwards from the central position likewise generates a retardation set-value proportional to the extent of its downward movement.

Figure 4:
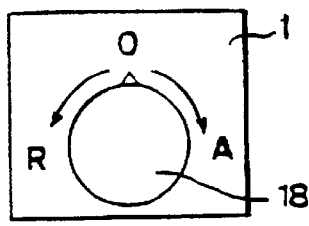
FIG. 4 shows an alternative version of a setting element of the device in FIG. 2.

FIG. 4 shows an alternative version of the setting element 1 of the second embodiment. In this case the control 2 incorporates a rotary knob 18 or the like which can be rotated in two opposite directions against return springs.

The present invention is not limited to the embodiments referred to above but may be varied and modified within the scope of the patent claims set out below. It should be noted that a larger or smaller number of vehicle components which affect the vehicle's drive may be connected to the device referred to. It is also possible to connect further sensors in order to receive signals which affect how the vehicle is to be driven. It should also be noted that the control of the setting element 1 may of course take many other different forms. This control may be fitted at many different points in the vehicle, e.g. at end of the flasher lever, in the gear lever button, in the centre of the steering wheel, in the side of the door, on the instrument panel or at any other position readily accessible to the driver. It should also be noted that within the scope of the patent claims it is possible to design the device so that it responds quicker to delivered torque from the engine and the torque set-value than to the vehicle's acceleration and/or retardation and the acceleration set-value and/or the retardation set-value. The invention may also be applied in combination with other known speed maintenance functions. Thus the lever or another separate control may be operated to a position which provides a function for the vehicle to adopt a set speed stored in a memory, usually called a "resume" function.

What is claimed is:

1. In a vehicle including a drive, a device which is operable for controlling speed and acceleration of the vehicle, the device comprising:

a control device connected to the drive, the control device being operable to a first operating state for operating the drive for causing the vehicle to maintain a substantially constant speed, and the control device being operable to a second operating state for operating the drive for causing the vehicle to accelerate;

an acceleration setting element so connected with the control device that the position of the setting element operates the control device to one of the operating states thereof; and in the second operating state of the control device, the setting element being settable for causing the drive to provide a selected substantially constant acceleration of the vehicle;

the setting element having a first position for operating the control device to the first operating state, and the setting element being movable in a first direction from the first position toward a second position for operating the control device to the second operating state;

when the setting element has moved to the second position, the setting element generates a first acceleration set value for the drive of the vehicle which allows the vehicle to accelerate with a constant acceleration, and wherein the setting element in the second position generates a second, constant acceleration set value which corresponds to the instantaneous set value generated by the setting element substantially immediately before the setting element is moved to the second position;

the setting element being movable to a third position, and the setting element in the third position generating an increasing acceleration set value for operating the control device to cause the drive to generate an increasing acceleration.

2. The device of claim 1, wherein the control device is operable to a third operating state for operating the drive for retarding the vehicle motion; and in the third operating state of the control device, the setting element being settable for causing the drive to provide a selected substantially constant retardation of the vehicle.

3. The device of claim 1, further comprising a first spring applying a first spring force opposing movement of the setting element from the first position to the second position and a second spring applying a second spring force greater than the first spring force opposing movement of the setting element from the second position to the third position thereof.

4. The device of claim 1, wherein the setting element is movable to the third position from the first position for reaching the third operating state of the control device.

5. The device of claim 4, wherein the direction of movement of the setting element from the first position to the third position thereof is in a second direction which is different from the first direction of movement of the setting element from the first position to the second position thereof.

6. The device of claim 4, wherein the control device has a fourth operating state for the drive which generates a retardation set value; and the control device has a fifth operating state for the drive which causes the vehicle to have an increasing retardation value which enables the vehicle to be retarded with increasing retardation;

the setting element being movable from the first position to a fourth position thereof where the setting element generates a fourth retardation set value for the drive of the vehicle to cause the vehicle to be retarded at a constant retardation, the fourth retardation set value corresponding to the instantaneous retardation set value which is generated substantially immediately before the setting element has been moved to its fourth position; and the setting element is movable to a fifth position thereof where the setting element generates an increasing retardation set value for causing the control device to retard the vehicle with increasing retardation.

7. The device of claim 6, further comprising means applying a first spring force opposing movement of the setting element from the first position to the fourth position thereof and means applying a second spring force, greater than the first spring force, for opposing shifting of the setting element from the fourth position to the fifth position.

8. The device of claim 6, wherein the vehicle drive includes at least one of a plurality of different components selected from the group consisting of a vehicle engine, a gear box for controlling the gear selection on the vehicle, a wheel brake for the vehicle, a braking arrangement for acting on a vehicle driveline, a vehicle clutch and an energy accumulator; and the control device being responsive to the position of the setting element for controlling at least one of the vehicle components.

9. The device of claim 1, where the setting element is shiftable in the first direction from the first position to operate the control device to the second operating state, such that the extent of shifting of the setting element in the first direction is matched by the generation of an increasing acceleration set value;

the setting element is shiftable in a second direction which is different from the first direction, from the first position such that the extent of shifting in the second direction generates an increasing retardation set value as the setting element is increasingly shifted in the second direction.

10. The device of claim 9, further comprising a spring force applying device applying an increasing spring force opposing increasing movement of the setting element from the first position in either of the first and the second directions.

* * * * *